United States Patent [19]

Nakayama et al.

[11] Patent Number: 5,008,603
[45] Date of Patent: Apr. 16, 1991

[54] ELECTRICALLY FOLDABLE REARVIEW MIRRORS INTERLOCKED WITH DOOR LOCKS

[75] Inventors: Kiyoshi Nakayama, Shizuoka, Japan; Darbesio Luigi, Orbassano, Italy

[73] Assignees: Murakami Kaimeido Co., Ltd., Sizuoka, Japan; Fiat Auto SpA, Turin, Italy

[21] Appl. No.: 493,323

[22] Filed: Mar. 14, 1990

[30] Foreign Application Priority Data

Dec. 20, 1989 [JP] Japan .................. 1-328527

[51] Int. Cl.$^5$ ............................ G05B 19/42
[52] U.S. Cl. .................. 318/568.1; 318/466; 318/603; 350/636; 307/10.2
[58] Field of Search ............ 318/560–640, 318/466, 464, 465; 350/634–637; 307/10.2; 340/825.31; 361/170–172

[56] References Cited

U.S. PATENT DOCUMENTS

| | | | |
|---|---|---|---|
| 4,159,866 | 7/1979 | Wunsch et al. | 350/636 |
| 4,267,494 | 5/1981 | Matsuoka et al. | 318/568.1 |
| 4,504,117 | 3/1985 | Mittelhauser | 318/568.1 X |
| 4,544,871 | 10/1985 | Suzuki | 318/568.1 |
| 4,657,362 | 4/1987 | Suzuki | 350/636 X |
| 4,682,088 | 7/1987 | Sullivan | 318/603 X |
| 4,698,571 | 10/1987 | Mizuta et al. | 318/568.1 |
| 4,707,788 | 11/1987 | Tashiro et al. | 318/466 X |
| 4,727,302 | 2/1988 | Mizuta et al. | 318/466 X |
| 4,798,967 | 1/1989 | Yamana et al. | 318/466 X |
| 4,866,433 | 9/1989 | Akutsu | 307/10.2 X |

FOREIGN PATENT DOCUMENTS

61-76742 5/1986 Japan .
1-47637 2/1989 Japan .

Primary Examiner—Paul Ip
Attorney, Agent, or Firm—Fleit, Jacobson, Cohn, Price, Holman & Stern

[57] ABSTRACT

A system for controlling the folded or erected rearview mirror position selectively by turning reversible motors (23,24) incorporated in the rearview mirrors by operating an operation switch (22) in the cabin of a motor vehicle, includes a door lock controller (10) locking the doors of the motor vehicle by an outer door lock switch (13,14) or inner door lock switch (15,16), a controller (20) for controlling the folded rearview mirrors, and switches (25,26,27,28) for detecting the folded or erected rearview mirror position mounted in the rearview mirror turning parts, in which an electrically foldable rearview mirror system is interlocked with the door lock controller (10) for controlling the folded rearview mirrors including a driving circuit (31,32) changing over the reversible motors between regular and reverse rotations, and a micro computer (30) controlling the driving circuit by processing the inputs from said switches. The rearview mirrors are folded or erected as a top priority by operating the operation switch (22) after the ignition switch (21) is actuated.

4 Claims, 15 Drawing Sheets

ELECTRICALLY FOLDABLE REARVIEW MIRRORS INTERLOCKED WITH DOOR LOCKS

BACKGROUND OF THE INVENTION

1. Field of the Invention

The present invention relates to a system for controlling rearview mirrors from an erected to a folded position, interlocked or not interlocked with the operation of door locking of a motor vehicle.

2. Description of the Prior Art

Since the right and left rearview mirrors of a motor vehicle project out largely from the body of the motor vehicle, the mirror case 5 thereof are moved from an erected to a folded position when parking or entering and leaving the garage in order to reduce the projection thereof. In general, such a foldable rearview mirror system comprises an operation switch mounted in the cabin of a motor vehicle, electric motors incorporated in the mirror cases, a rotational motion transmission mechanism turning the mirror cases from the erected to the folded position and vice versa by the rotation of the electric motors, and a controller for controlling the rotation of the electric motors after making the operation switch. However, this conventional rearview mirror system is inconvenient because the rearview mirrors must be folded by operating the switch whenever leaving the motor vehicle in order to hold the rearview mirrors in the folded position. Therefore, in Japanese Utility Model Laid Open Publication No. 76742/86, the rearview mirrors are folded automatically when the doors is locked after the ignition key is removed, and they are erected when the door is unlocked. In Japanese Patent Laid Open Publication No. 47637/89 is disclosed an apparatus for controlling selectively the folding and erecting of the rearview mirrors interlocked with the door locks according to the logical conditions of detectors for detecting the locked door knob position, the locked doors, the operated steering wheel, the locked engine key, the unlocked engine key, the change-over between MANUAL and AUTOMATIC, as well as the folded and erected rearview mirrors.

In said apparatus for controlling the rearview mirrors described in Japanese Utility Model Laid Open Publication No. 76742/86, the rearview mirrors can not be folded or erected independently of the door locks because it has no manual operation switch. And according to Japanese Patent Laid Open Publication No. 47637/89 it is necessary to change over between MANUAL and AUTOMATIC and the operation is complicated, which may result in forgotten operations. In addition, the system described in Japanese Patent Laid Open Publication No. 47637/89 requires a lot of switches and the electric motors have the possibility of burnout in an unlocked condition. Since the controlling systems according to both of the Publications have no means for detecting any obstruction which is moved or arranged outside the rearview mirrors after the rearview mirrors have been folded, the rearview mirrors are struck by said obstruction and the cases thereof are broken or damaged seriously if they are erected automatically. In addition, since both controlling systems have no switch for detecting the rearview mirror folded or erected position, a motor lock or a clutch operates till the electric motors stop, which will result in deteriorated electric motors, or displeasure.

The object of the present invention is to provide a system for folding and erecting the rearview mirrors automatically and correctly wherein a door lock controller and an electric folding apparatus are connected with each other by a micro computer.

SUMMARY OF THE INVENTION

According to the present invention, the operation of a seesaw switch for electric folding is processed as a top priority under the locked or unlocked condition of a door lock key switch. That is, the system according to the present invention comprises a door lock controller, electrically foldable rearview mirrors with incorporated electric motors, driving circuits for the reversible motors for the rearview mirrors, a group of switches including an ignition switch, a manual two-circuit reversible motor operation switch, an outer door lock key switch, an inner door lock key switch, and switches for detecting the folded or erected positions of the rearview mirrors, as well as a micro computer processing the input from each switch and controlling the driving circuits for the motors electrically folding the rearview mirrors.

When the ignition switch is in ON position, the rearview mirrors are folded or erected as a top priority by operating the manual two-circuit reversible motor operation switch (for example a one-touch seesaw switch). When the ignition switch is in OFF position, the rearview mirrors are folded by locking the door lock key switch, and they are erected after a predetermined period of time ($T_1$) by unlocking it, however, if they were folded just before by the manual switch, they are not folded automatically. The door lock key switch is changed over from LOCK to UNLOCK and vice versa also by operating the inner door lock switch, but the rearview mirrors are not folded at that time. If any operation is carried out, the operation signal just before is cancelled. A reversing operation is also possible while the rearview mirrors are being folded or erected, and even if a motor lock slip happens, the motor concerned stops after a period of time ($T_2$).

DESCRIPTION OF THE DRAWINGS

These and other objects, features and advantages of the present invention will become more evident from the following description of the preferred embodiments taken in conjunction with the accompanying drawings, wherein.

DESCRIPTION OF THE PREFERRED EMBODIMENTS

The present invention will now be described in detail with reference to the drawings.

Figure 1:
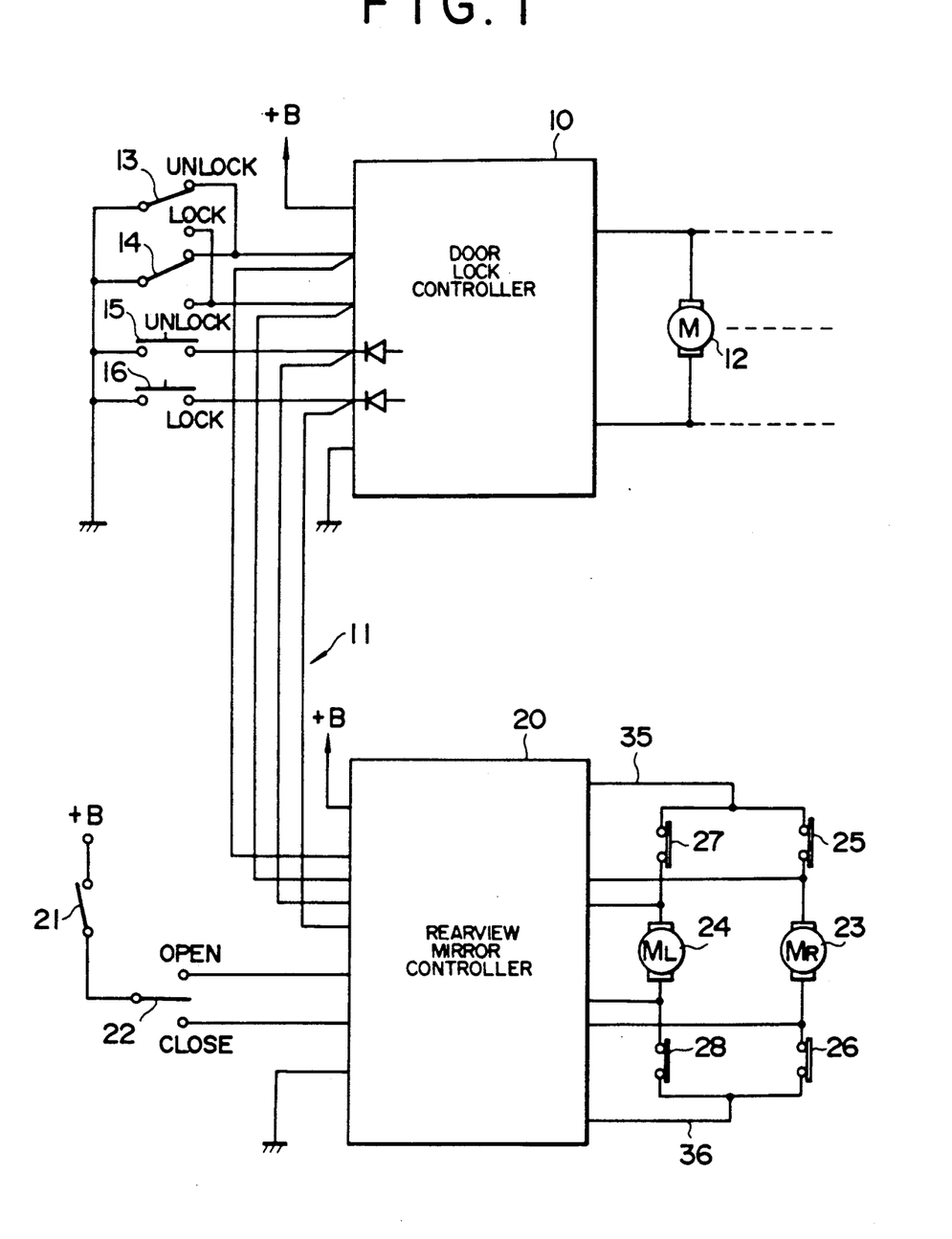
FIG. 1 is a block diagram of a whole system according to the present invention.

This embodiment is applied to motor vehicles having generally known types of door locks, and the whole system is shown in FIG. 1.

In FIG. 1 a door lock controller 10 and a controller for controlling the folding of the rearview mirrors 20 are interconnected by a control bus 11. The door lock controller 10 has a power supply, a ground and a group of input switches, and on the output side thereof, for example, 6 electric motors 12 for locking the doors are connected in parallel.

As a group of switches, single-pole single-throw lock key switches for right and left doors 13, 14, a single-pole single-throw inner door unlock switch 15, and an inner door lock switch of the same type 16 are used. The controller for controlling the folding of the rearview mirrors 20 has, as described later with reference to FIG. 2, a built-in four-bit one-tip micro computer and relay circuits 31, 32, and with the input side of the controller 20 not only the control bus 11 from said group of switches 13, 14, 15, 16, but also a seesaw switch 22 connected in series with ignition switch 21 are connected, and on the output side thereof motor circuits 35, 36 are connected, wherein the motor circuits 35, 36 include reversible motors 23, 24 for electrically folding right and left rearview mirrors, as well as limit switches for detecting the folded or erected rearview mirror position 23-28 as described for example in U.S. patent application Ser. No. 187,965.

Figure 2:
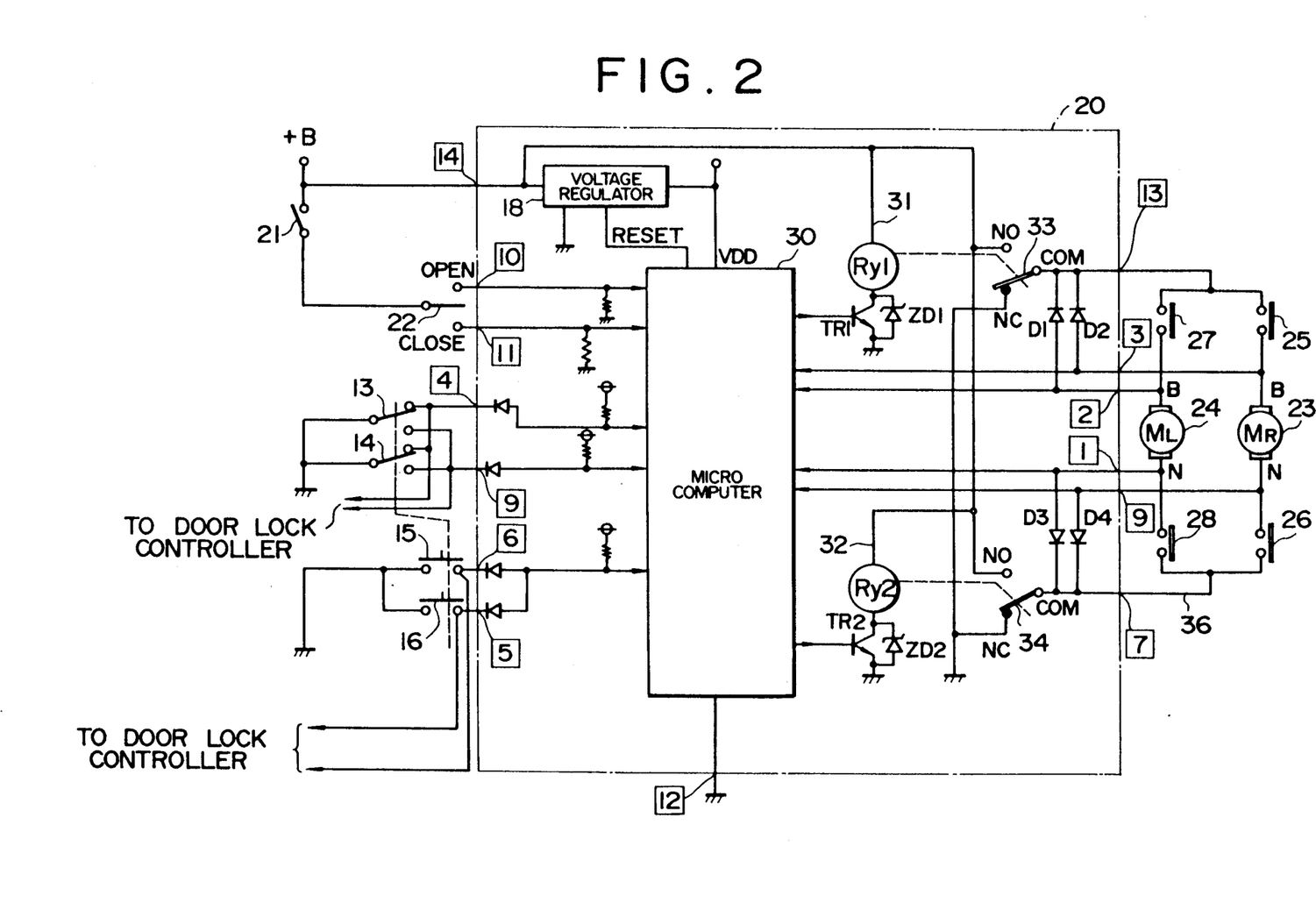
FIG. 2 is a circuit diagram of a controller for controlling the folding operations of the rearview mirrors.

FIG. 2 shows the makeup of the controller for controlling the folding 20 including a four-bit micro computer 30 for processing each input of the switch group, an erecting relay circuit 31 closed when the mirror cases are turned to the erected (reset) side, a folding relay circuit 32 closed when the mirror cases are turned to the folded side, and a voltage regulator 18.

Figure 5:
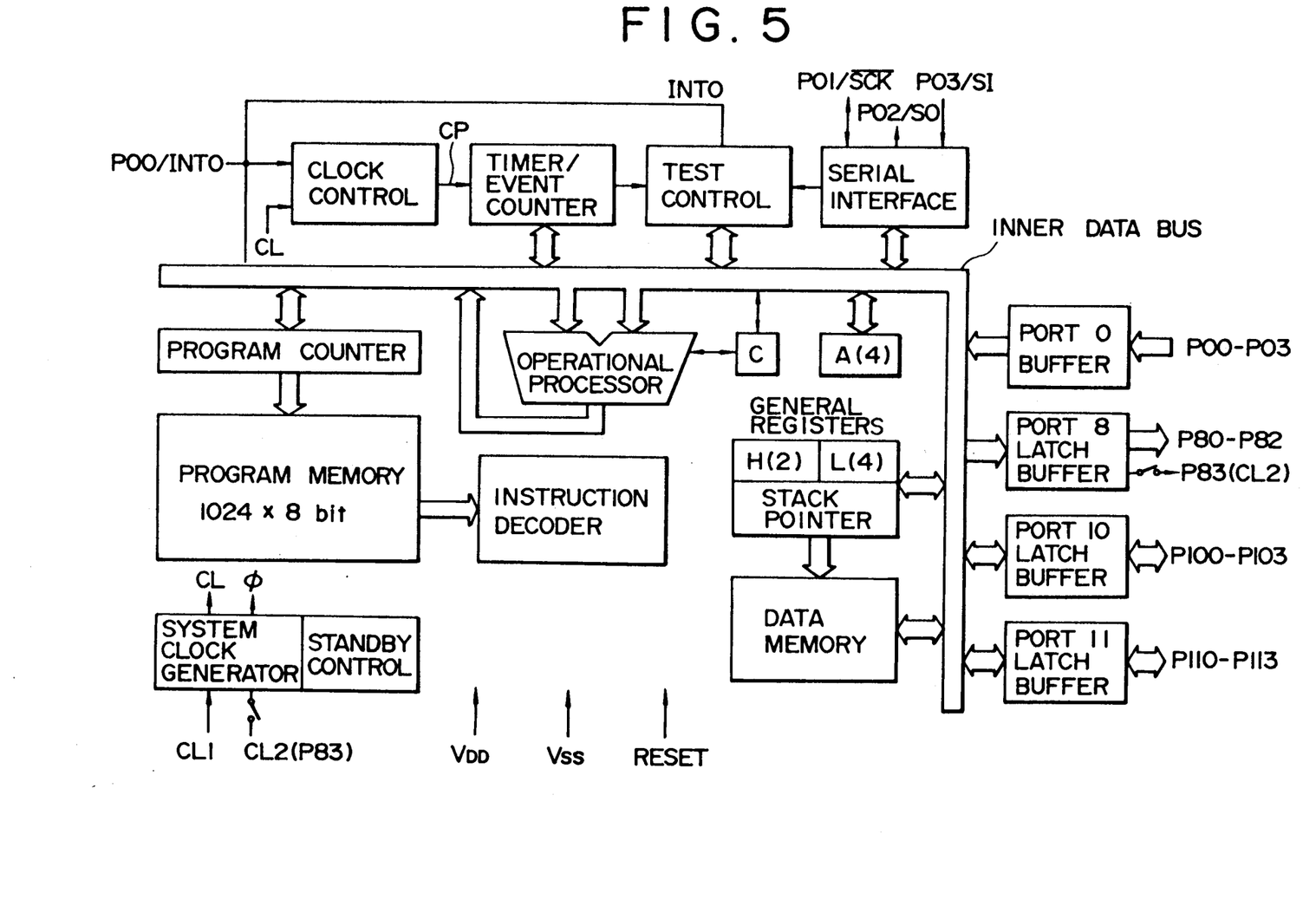
FIG. 5 is a block diagram of the inside of a micro computer.

Micro computer 30 is a type including not only ROM, RAM, I/O, and CPU but also peripheral circuits such as a timer, counter and serial interface, for example $\mu$PD 7554CS (NEC), may be used (See FIG. 5). The erecting relay circuit 31 and the folding relay circuit are connected in parallel with each other. Self-holding circuits are formed respectively by connecting the transfer-type relay contact 33 of the erecting relay Ry1 and the transfer-type relay contact 34 of the folding relay Ry2 in parallel with each other. These relays are connected to the collector sides of transistors Tr1 and Tr2 respectively, and are driven because said transistors are made when the signals from the micro computer 30 are impressed on the base thereof. The transistors Tr1 and Tr2 are grounded at the emitter thereof and have Zener diodes for protection ZD1 and ZD2 between collector and emitter respectively, however, the base voltage from the micro computer is not impressed on both of the transistors simultaneously.

As shown in FIG. 2, the limit switches 25-28 are arranged in series respectively with the motors for electric folding 23, 24 between. The limit switches 25, 26 are used to detect the erected and folded positions of the right rearview mirror, and the limit switches 27, 28 are used to detect the erected and folded positions of the left rearview mirror. The reversible motors 23, 24 turn the mirror cases to the folded position when current flows from terminal N to terminal B, and turn them to the erected position when current flows from terminal B to terminal N.

In the following the operation will be described.

First, the case wherein both of the right and left mirror cases are in the folded positions will be described.

When the switch 22 in FIG. 2 is pushed to OPEN side while the right and left mirror cases are in the folded positions, and the ignition switch 21 is in ON position, the transistor Tr1 is made through the output of the micro computer 30, actuating the relay Ry1. As soon as the relay contact 33 is changed over to NO (Normal Open) side, relay Ry1 is self-held to the NO side through the output of the micro computer.

Since the limit switches 25 and 27 are closed while the mirror cases are in the folded positions, the motor circuit 35 is closed, and current flows from terminal B to terminal N, rotating the motors 23, 24 so that the mirror cases are turned to the erected sides. At the beginning of the erecting operation the limit switches 26, 28 of the erected sides are in OFF positions, however, current flows through diodes D3, D4, and immediately after the operation the switches 26, 28 are put to ON. When the limit switch 27 is put to OFF soon after one of the mirror cases, for example the left mirror case L, has reached an erected end, the motor driving circuit 35 is opened to stop the motor 24.

When the limit switch 25 is put to OFF after the other mirror case, for example the right mirror case R, has reached an erected end, the motor circuit 35 is opened to stop the motor 23. Simultaneously with the stop of the motor the micro computer 30 reads the OFF signal of the limit switch 25 and stops the output to the transistor Tr1, thereby putting the relay Ry1 to OFF. When the switch 22 is pushed to the folded side while both of the right and left mirror cases are in the erected positions, the relay Ry2 is actuated and the relay contact 34 is changed over to conduct current from the terminal N to the terminal B, thereby reversing the motors 23, 24 and thus turning the mirror cases to the folded sides.

Since the limit switches 26 and 28 are closed when the switch 22 is changed over to the closed side while the mirror cases are in the erected positions, the motor circuit 36 is closed, and current flows from terminal N to terminal B, rotating the motors 23, 24 in the reverse direction so that the mirror cases are turned to the folded side. At the beginning of the folding operation the limit switches 25, 27 of the folded sides are in OFF positions, however, current flows through diodes D1, D2, and immediately after the operation the switches 25, 27 are put to ON. Meanwhile, the motor driving circuit 36 is opened to stop the motor 24 when the limit switches 28 are put to OFF after one of the mirror cases, for example left side mirror case L, has reached the folded ends, and the motor 23 is stopped by putting the limit switches 26 to OFF as the same.

Figure 3:
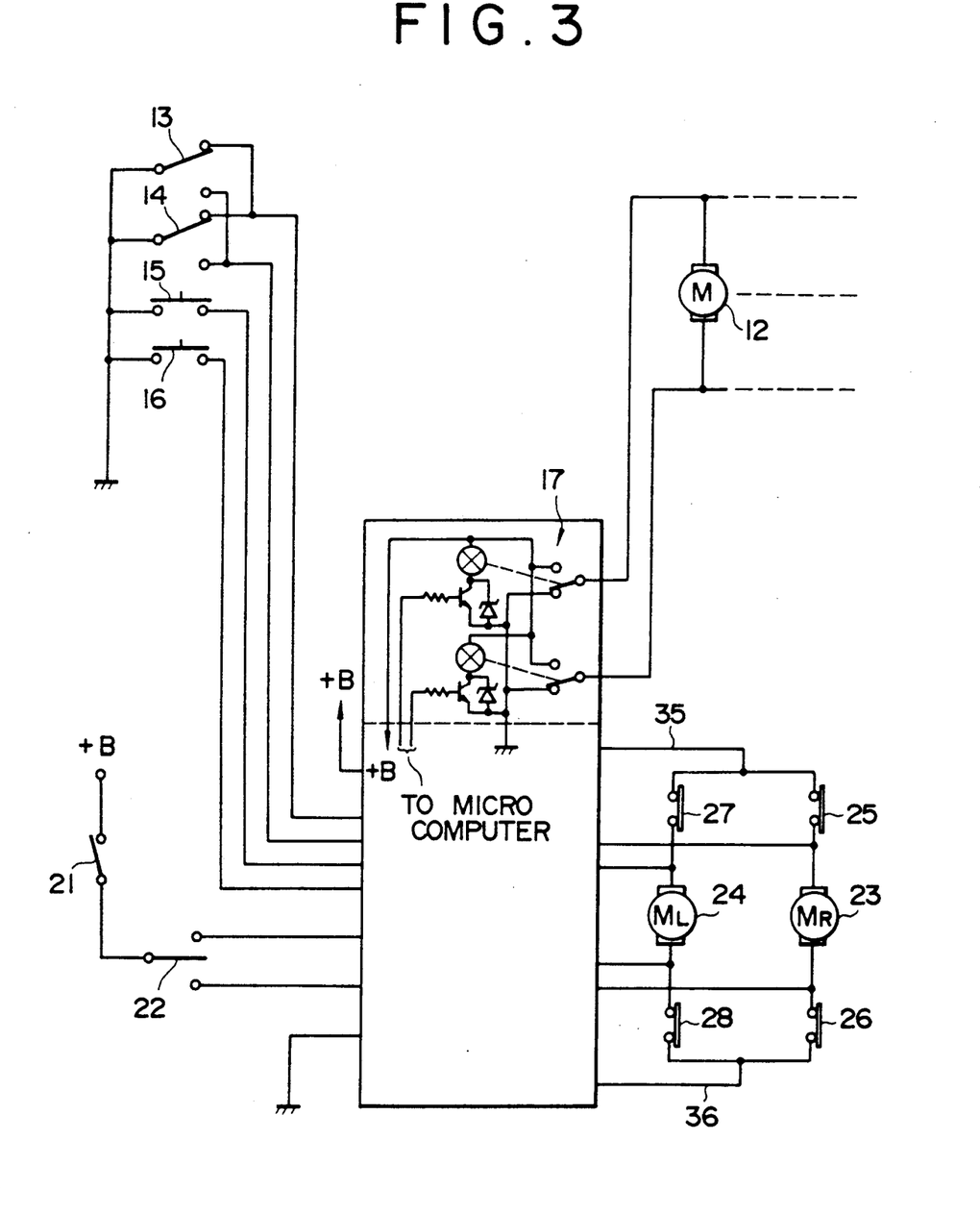
FIG. 3 is a block diagram showing a variation of FIG. 1.

FIG. 3 shows the whole system wherein the door lock controller 10 shown in FIG. 1 is incorporated into the controller 20 for controlling the electric folding. The door lock controller shown in FIG. 3 has a relay circuit 17 for driving the door lock motors 12 regularly and reversely.

Figure 4:
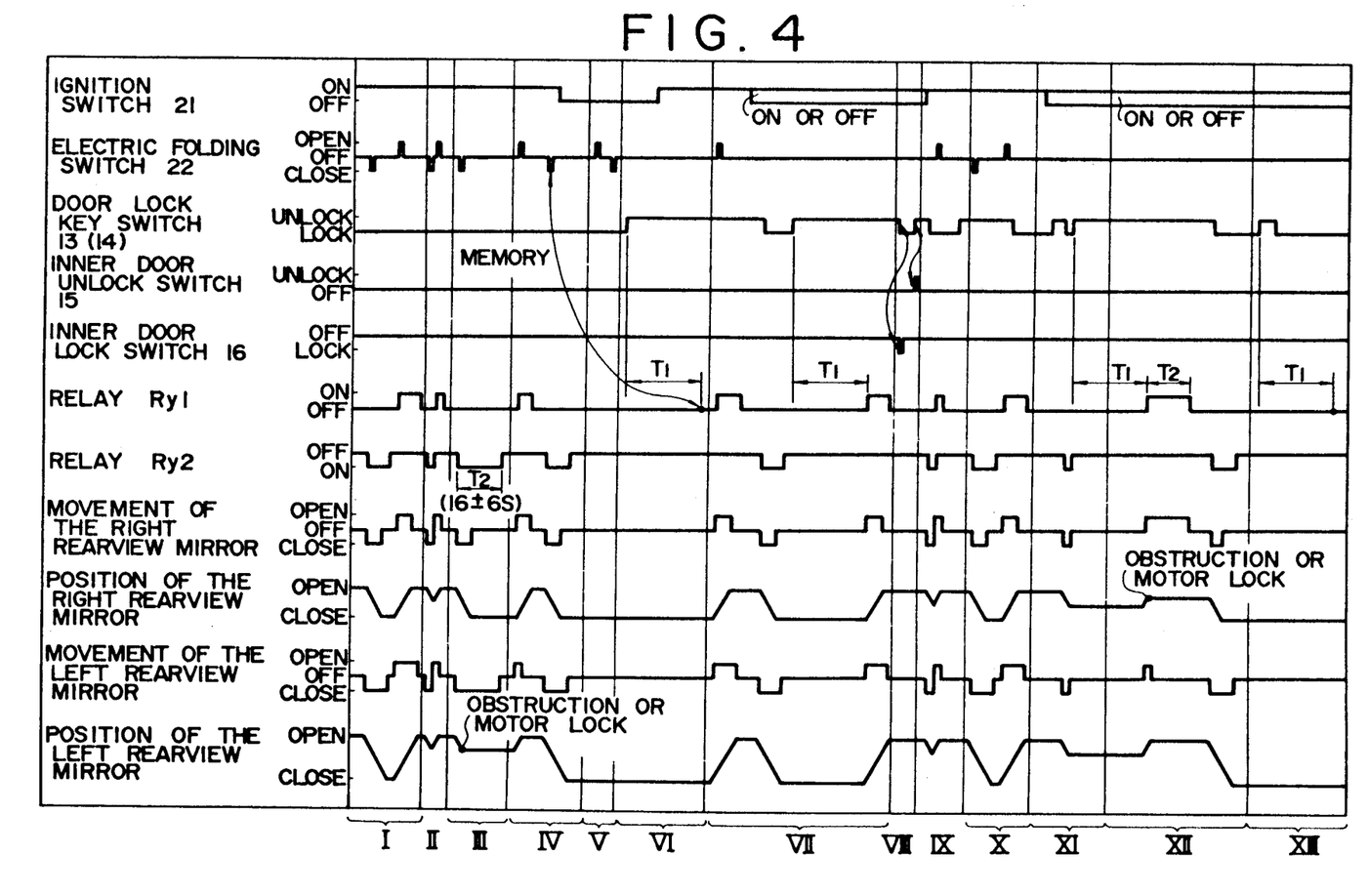
FIG. 4 is a timing chart.

FIG. 4 shows the timing chart of the system. In the left section of the chart ON and OFF of the switches including the ignition switch and the relays as well as the conditions of the rearview mirrors are indicated, and the lower section is divided into the zone I to XIII according to the conditions of each component. In the following each zone will be described.

I. When the ignition switch is in ON position, the rearview mirrors are erected or folded by the electric folding operation switch 22.

II. The rearview mirrors can be reversed by opening or closing the electric folding operation switch 22.

III. If the rearview mirrors are struck by an obstruction while being turned, they are stopped, and the relays are put to OFF after the timer time $T_2$ (for example 16±6 seconds).

IV. Even if the ignition switch 21 is put to OFF while the rearview mirrors are being turned, they are moved to the last positions thereof.

V. When the ignition switch 21 is in OFF position, the rearview mirrors can not be moved even if the electric folding operation switch 22 is operated.

VI. After the rearview mirrors have been folded electrically by the switch 22, they are not erected automatically.

VII. When the rearview mirrors are operated by the door lock key 13 or 14, they are folded automatically and erected automatically. However, they begin to be operated after the time $T_2$ (for example 20 seconds) when erected automatically.

VIII. The relays are not actuated even if the inner door lock switches 15, 16 are operated.

IX, X. Top priority is given to the operation of the electric folding operation switch 22. In IX the rearview mirrors can be reversed by the switch 22 even if they are being operated, and in X the rearview mirrors are not affected by the switches 13, 14 while operated by the electric folding operation switch 22.

XI. When the door lock key switches 13, 14 are changed over to UNLOCK while the rearview mirrors are being folded by the operation of the switches 13, 14, the rearview mirrors are stopped temporarily and erected after the time $T_2$.

XII. If the rearview mirrors are struck by an obstruction while being turned, or the motors are locked, the rearview mirrors are stopped, and the relays are put to OFF after the time $T_2$.

XIII. When the door lock key switches 13, 14 are locked on within the time $T_1$ after they have been unlocked, the rearview mirrors are not erected. Priority is given to the operation immediately before.

Figures 6, 6B:
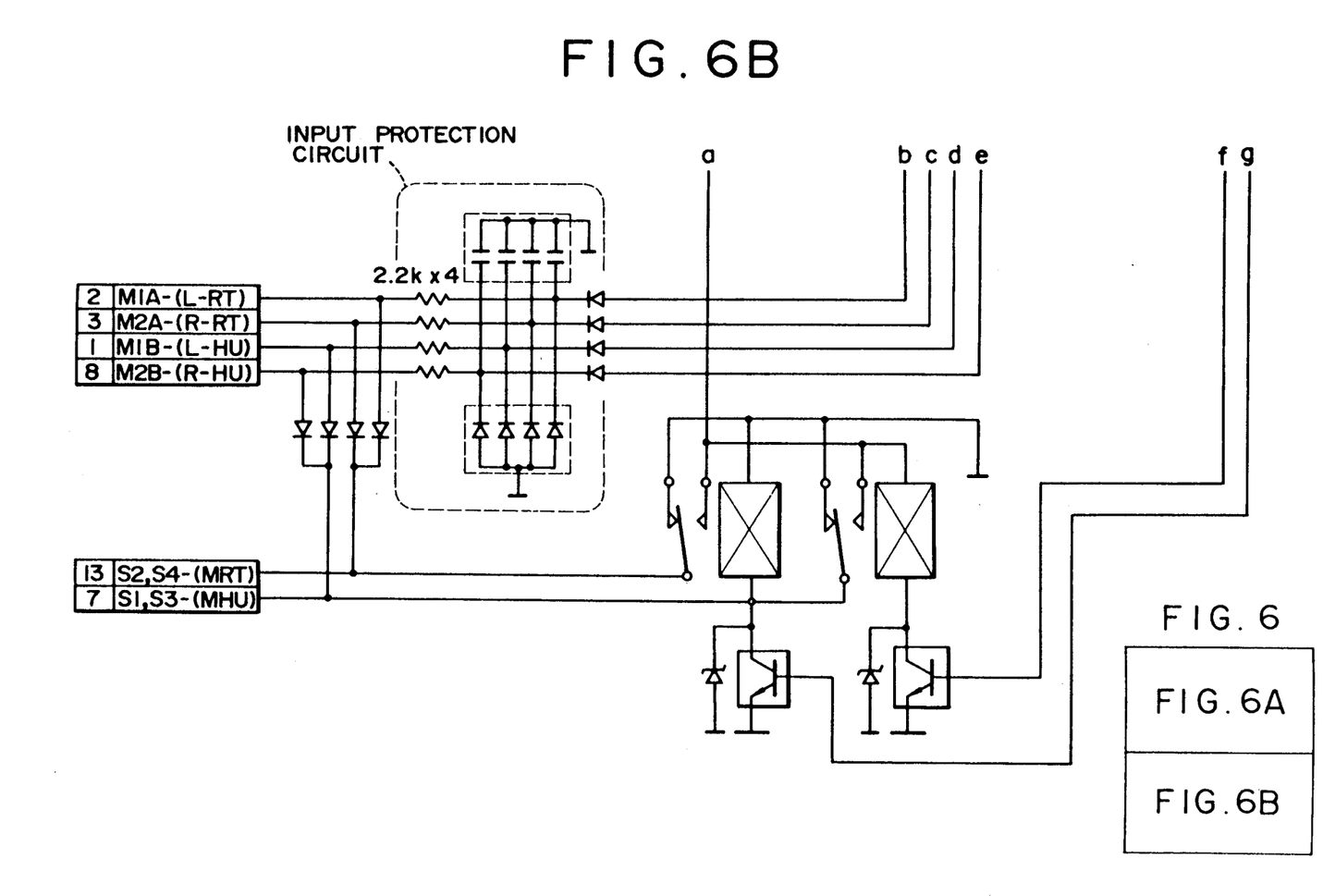
FIG. 6 is a circuit diagram around the micro computer, FIGS. 6A and 6B taken together as one area the diagram of FIG. 6.

FIG. 5 is a block diagram of the inside of said four-bit single-tip micro computer, and FIG. 6 is a circuit diagram around said micro computer. In the following resetting/watch dog concerns will be described with reference to FIGS. 6A and 6B. The voltage stabilizer device TA8001S (Toshiba), is connected to a capacitor to at the sixth pin thereof. When the capacitor is charged, the voltage at point A is 1.5 V and above, and further the output voltage at the stabilizing power source is 4.75 V, no resetting is output, however, when the voltage at point A is lower than 1.5 V, resetting is output, which is used as a watch dog timer.

Figure 6A:
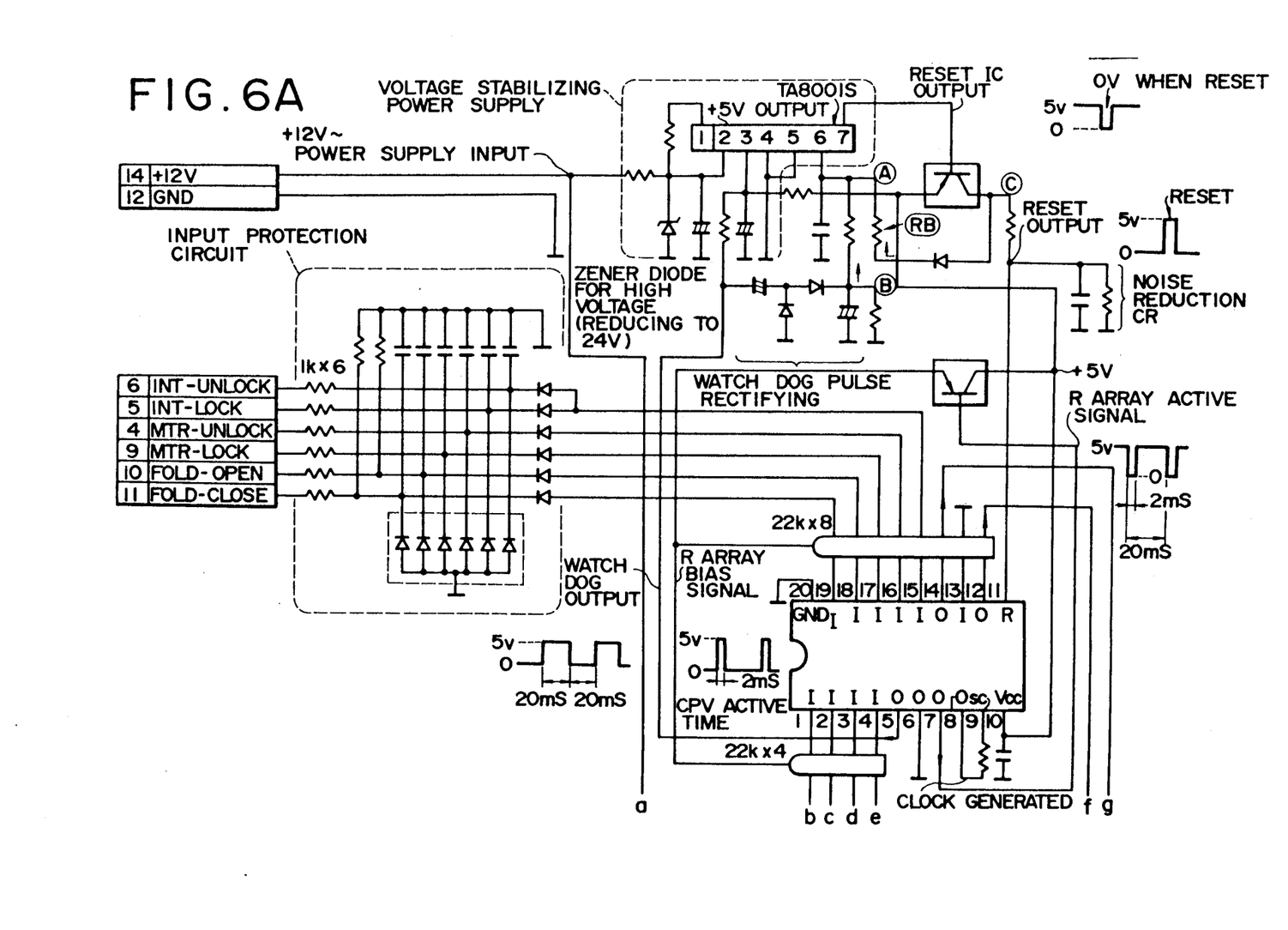

Since the watch dog output is kept at +5 V or 0 V if the CPU runs recklessly and does not execute the normal program, only DC pulses are generated and the rectifying voltage B of rectifying circuit of watch dog pulse is reduced to 0 V. Accordingly, the voltage at point A is also reduced gradually, and when this voltage is less than 1.5 V, a resetting pulse is output. Since resetting is maintained in this condition, voltage is impressed from the resetting output C on the sixth pin by the resistor RB, charging point C and thus releasing the reset condition.

Figure 7:
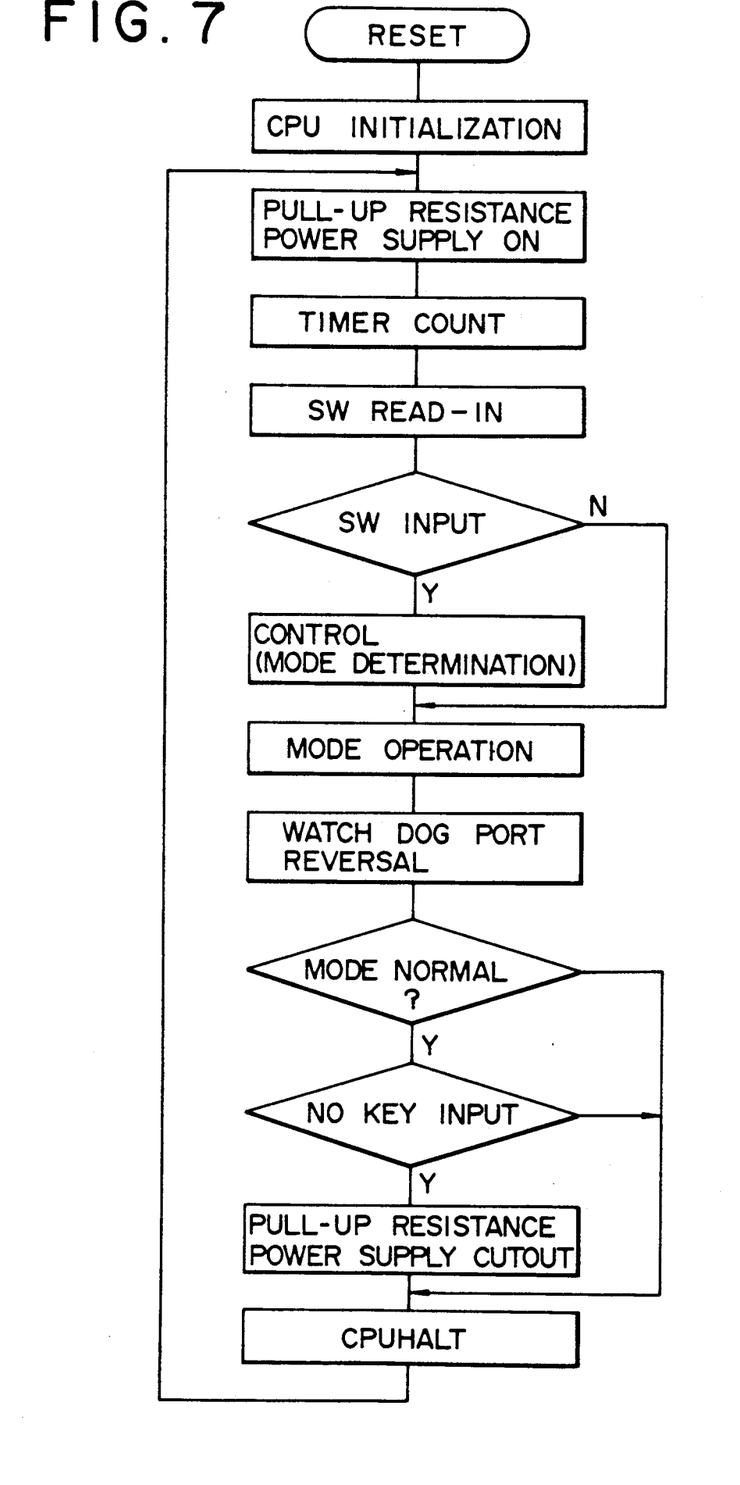
FIGS. 7–14 are flow charts.
Figure 8:
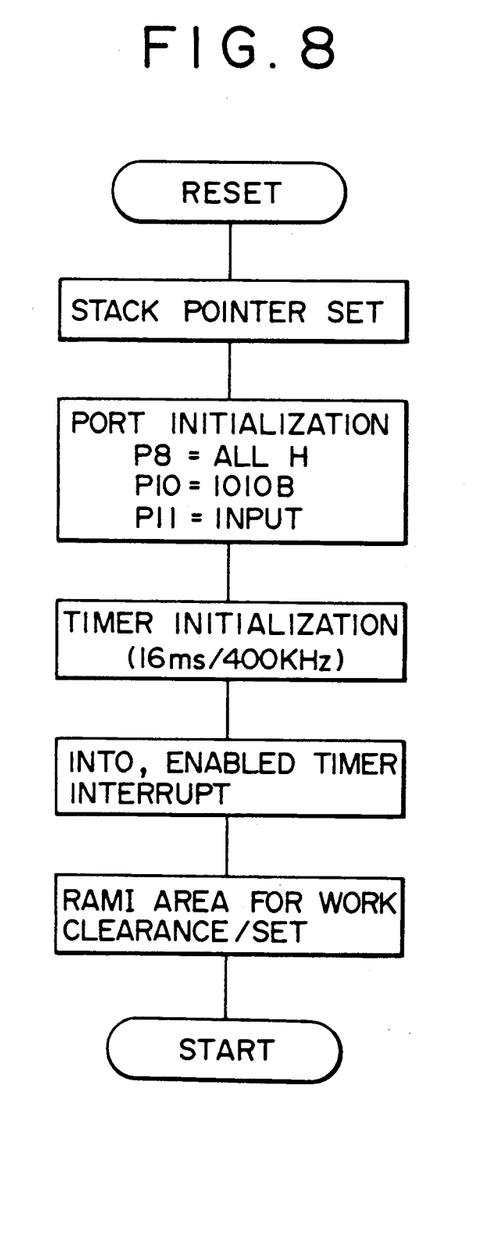
Figure 9:
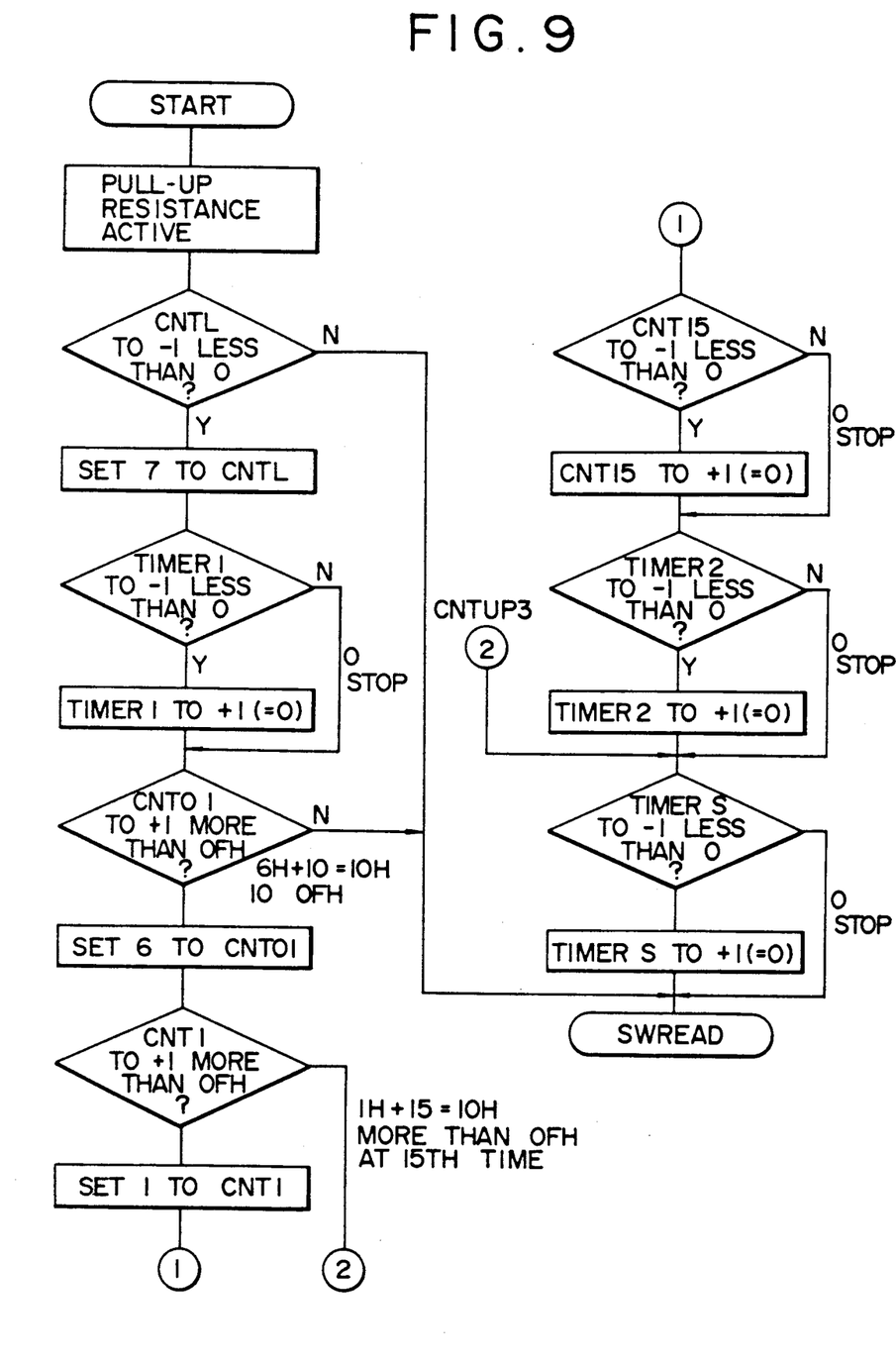
Figure 10:
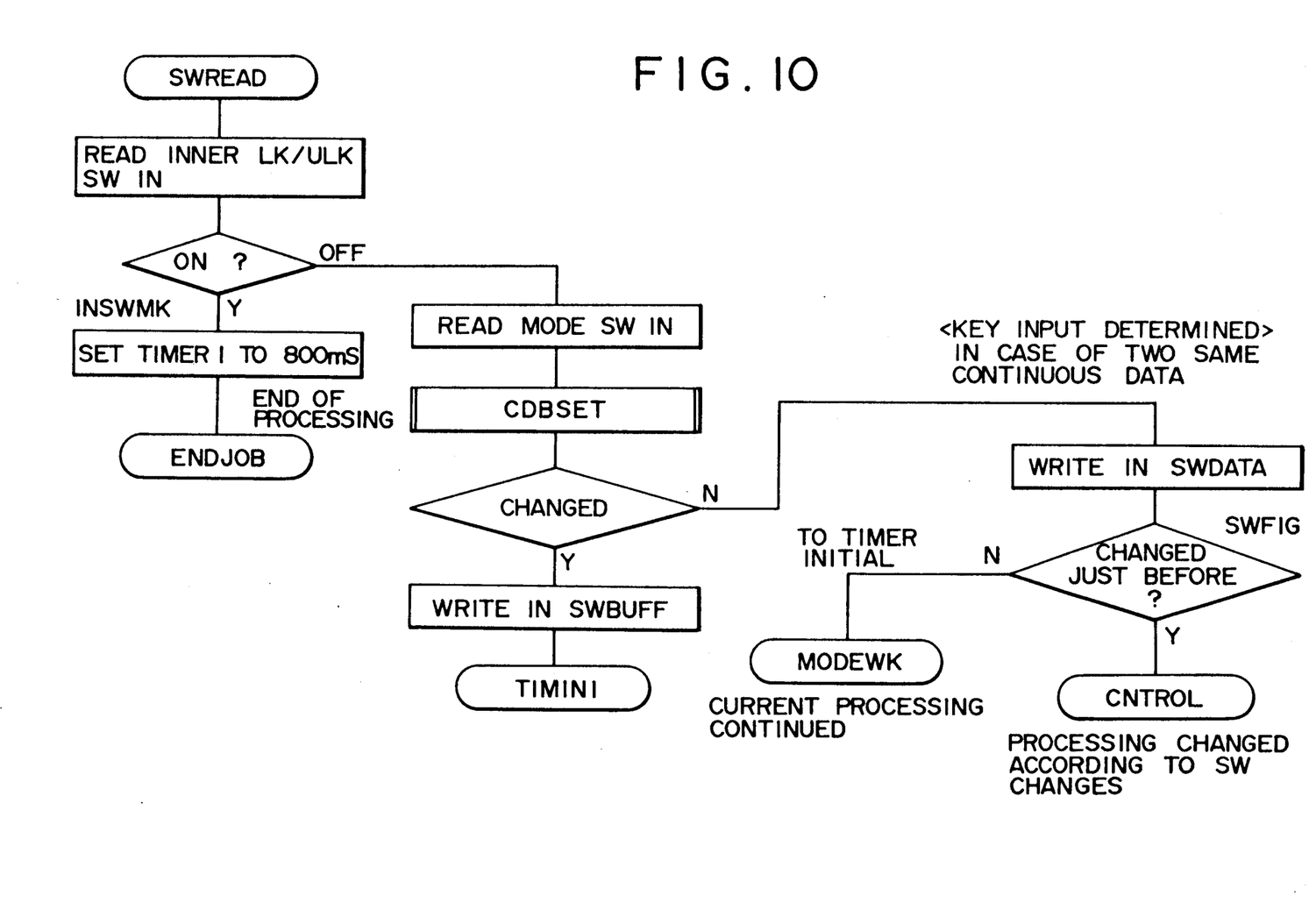
Figure 11:
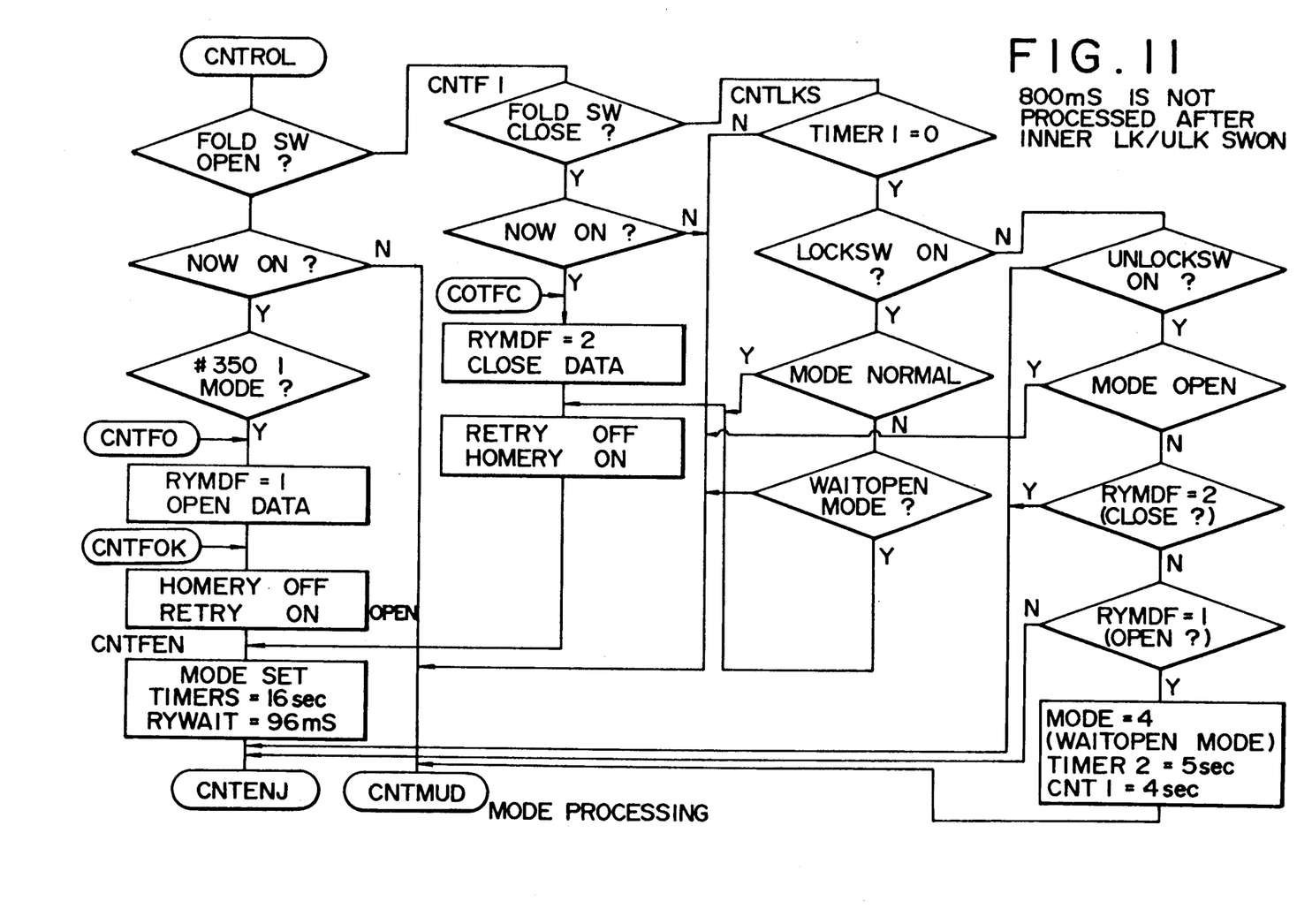
Figure 12:
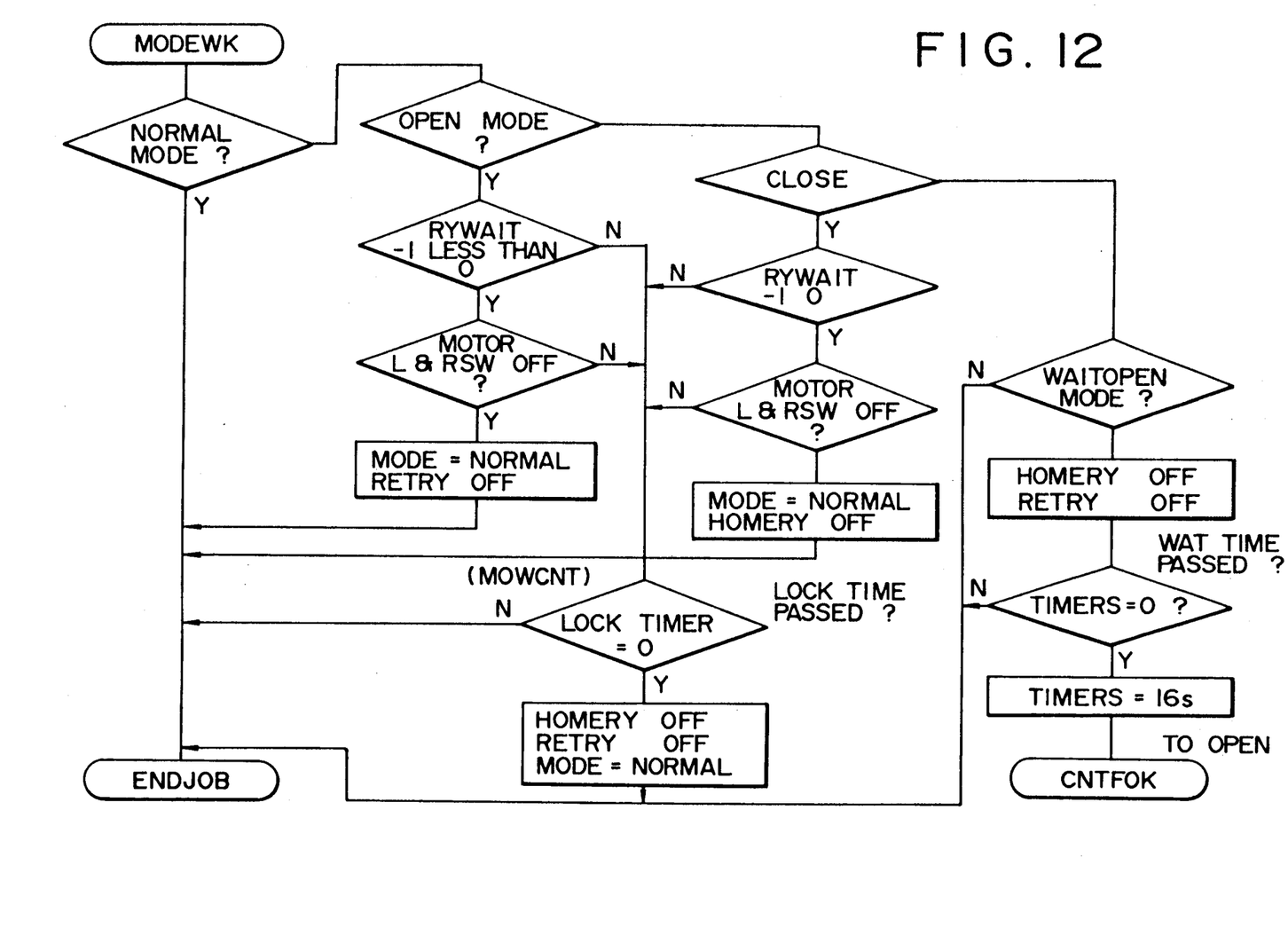
Figure 13:
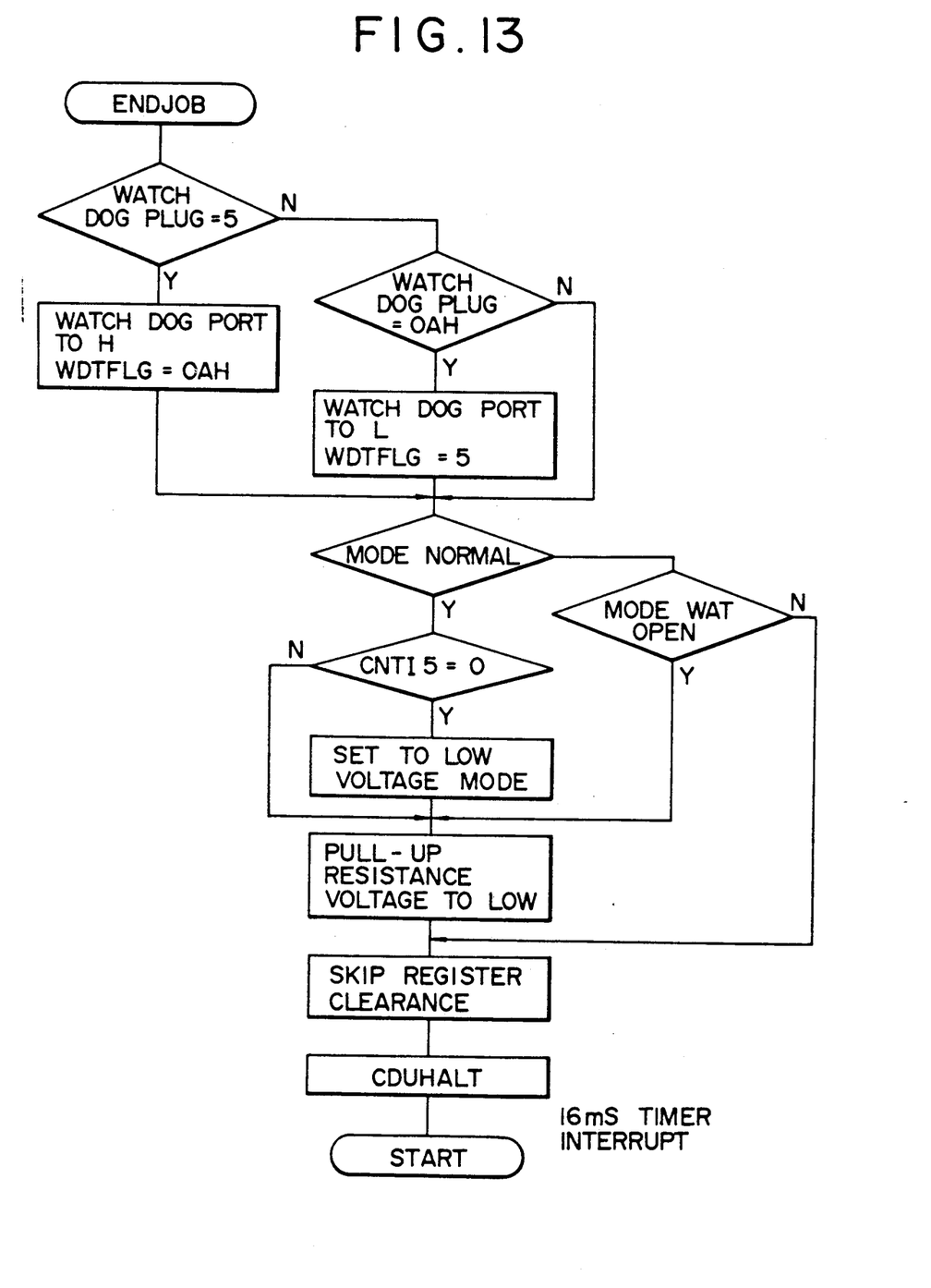
Figure 14:
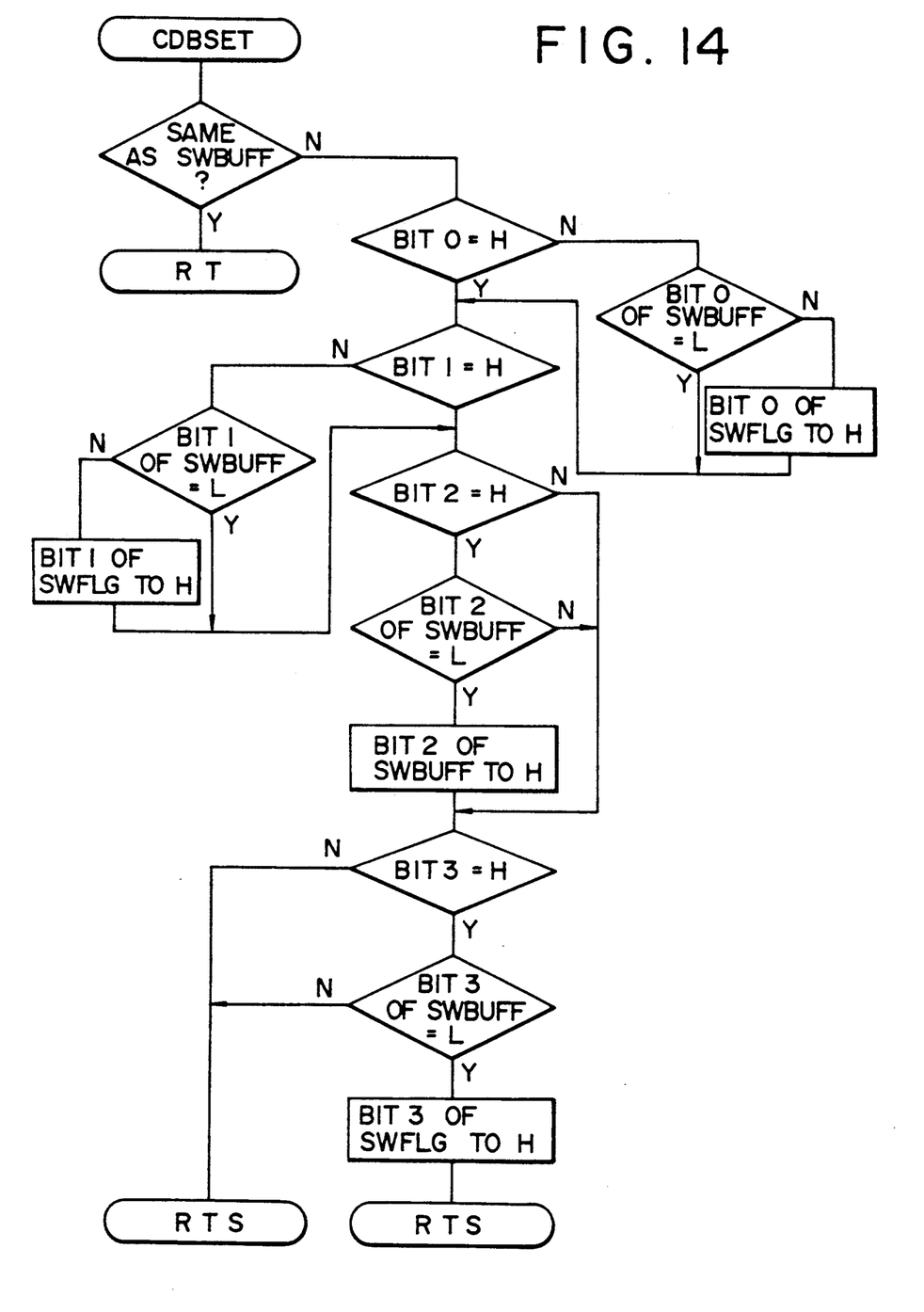

FIGS. 7–14 show a flow of the control program of the micro computer 30. FIG. 7 is a general flow, FIG. 8 is an initial routine, FIG. 9 is a timer routine, FIG. 10 is a switch read-in routine, FIG. 11 is a electric folding/outer lock/unlock routine, FIG. 12 is a mode control routine, FIG. 13 is a process end routine, and FIG. 14 is a switch change plug set subroutine.

In the following the embodiment will be described further:

(1) The locking part of the driver's seat or assistant driver's seat is changed over by either the door key or the motor.

(2) The object of the delay $T_1$ is to move the motor vehicle during the time $T_1$ till the rearview mirrors have been erected so that any obstruction may be avoided.

As described above, according to the present invention, the door locking system and the electric folding apparatus are connected with each other by the micro computer, thus enabling the rearview mirrors to be folded and erected automatically and surely.

While several forms of the invention have been shown and described, other forms will now be apparent to those skilled in the art. Therefore, it will be understood that the embodiments shown in the drawings and described above are merely for illustrative purposes, and are not intended to limit the scope of the invention which is defined by the claims which follow.

We claim:

1. A system for controlling a position of foldable rearview mirrors on a motor vehicle comprising:

at least one rearview mirror foldably mounted on the vehicle for movement between a folded position when not in use and an extended position for use;

a door lock controller operatively connected to door locks of the vehicle for locking and unlocking doors of the vehicle;

at least one outer door lock switch and at least one inner door lock switch operatively connected to said door lock controller for operating said door locks between locking and unlocking positions;

reversible electric motor means operatively connected to said at least one rearview mirror for operating said at least one rearview mirror between said folded and extended positions when actuated;

a rearview mirror controller having an input side and an output side, said output side being operatively connected to said reversible electric motor means for actuating said motor means and said door lock controller and said at least one outer door lock switch and at least one inner door lock switch being operatively connected to said input side;

ignition switch means and operation switch means inside the vehicle connected in series between an electric power source and said input side of said rearview mirror controller, said ignition switch means and operation switch means having open and closed positions, said operation switch means comprising a manual-two circuit reversible motor operation switch;

a driving circuit in said rearview mirror controller operatively connected to said electric motor means for reversing the rotation of said electric motor means in response to said open and closed positions of said operation switch so that when said ignition switch means is in the closed position and said operation switch means is in said open position said driving circuit operates said electric motor means to move said at least one rearview mirror into said folded position and when said operation switch means is in said closed position said driving circuit operates said electric motor means into said extended position;

limit switch means mounted on said at least one rearview mirror for detecting said folded and extended positions of said at least one rearview mirror; and a micro computer operatively connected to said driving circuit for controlling said driving circuit by processing inputs from said switches.

2. A system as claimed in claim 1 wherein:

said at least one door lock switch is operatively connected to said rearview mirror controller so that when said ignition switch means is in said open position and said at least one door lock switch is in the open position said at least one rearview mirror is folded, and when said at least one door lock switch is in the closed position said at least one rearview mirror is extended after a predetermined time delay period.

3. A system as claimed in claim 1 wherein:

said micro computer comprises a four-bit, single-tip board including ROM, RAM, I/O, CPU, and timer, counter and serial interface peripheral circuits in one tip.

4. A system as claimed in claim 2 wherein:

said micro computer comprises a four-bit, single-tip board including ROM, RAM, I/O, CPU, and timer, counter and serial interface peripheral circuits in one tip.

* * * * *